United States Patent [19]

Denis et al.

[11] 4,159,736

[45] Jul. 3, 1979

[54] METHOD OF AND ARRANGEMENT FOR THE SEASONAL STORAGE AND USE OF HOT WATER PRODUCED IN PARTICULAR BY ELECTRICAL POWER-GENERATING THERMAL AND NUCLEAR STATIONS

[75] Inventors: Louis H. D. Denis, Puteaux-Bellini; Abel J. H. Bedue, Versailles; Jacques Malherbaud, Chatou, all of France

[73] Assignee: Technip, Rueil-Malmaison, France

[21] Appl. No.: 668,000

[22] Filed: Mar. 18, 1976

[30] Foreign Application Priority Data

| Mar. 20, 1975 [FR] | France | 75 08747 |
| Jun. 19, 1975 [FR] | France | 75 19253 |
| Aug. 27, 1975 [FR] | France | 75 26419 |

[51] Int. Cl.² ............ F28D 17/04; F24H 7/00; F01K 3/02
[52] U.S. Cl. ............ 165/104 S; 60/659; 126/400; 165/45; 165/DIG. 4
[58] Field of Search ........... 165/104 S, 45, DIG. 4, 165/DIG. 21; 126/400, 271; 60/659

[56] References Cited

U.S. PATENT DOCUMENTS

| 3,077,190 | 2/1963 | Allen | 126/271 |
| 3,851,495 | 12/1974 | Lahoud et al. | 165/45 |
| 3,996,749 | 12/1976 | Denis et al. | 60/659 |
| 4,010,731 | 3/1977 | Harrison | 126/400 |
| 4,024,910 | 5/1977 | Werner | 165/45 |
| 4,031,952 | 6/1977 | Contour | 165/104 S |

Primary Examiner—Ronald H. Lazarus
Assistant Examiner—P. S. Lall
Attorney, Agent, or Firm—Frishauf, Holtz, Goodman and Woodward

[57] ABSTRACT

A large capacity tank for the seasonal storage of hot water from electrical power-generating thermal and nuclear plants to be used seasonally to heat buildings, consisting of a large basin which comprises partitions dividing the basin into several portions communicating with each other in parallel and/or series relationship, at least one hot water supply input from said plants, leading to the distribution systems which open into one portion of the basin and at least one cold make-up and-/or return water supply input for the distribution systems opening into another portion of said basin.

6 Claims, 22 Drawing Figures

METHOD OF AND ARRANGEMENT FOR THE SEASONAL STORAGE AND USE OF HOT WATER PRODUCED IN PARTICULAR BY ELECTRICAL POWER-GENERATING THERMAL AND NUCLEAR STATIONS

BACKGROUND OF THE INVENTION

The present invention relates to a method and to plants or arrangements enabling for seasonal storage and use of hot water produced in particular by electrical power-generating thermal and nuclear plants or stations.

The Applicant has already disclosed previously in U.S. patent application Ser. No. 574,418, filed on May 5, 1975 entitled Method and Plants for Producing Storing, "Modulating and Distributing Energy" now U.S. Pat. No. 3,996,749, means adapted to use in particular for district heating purposes and for various industrial applications the huge amounts of heat presently wastefully lost or discharged to the detriment of the ecology from electrical power-generating thermal and nuclear stations. The invention forming the subject matter of the above-mentioned U.S. patent actually enables to multiply with a factor usually ranging from 1 to 5 and according to the operating requirements and lay-out conditions the available power supplied by the existing power plants consuming given amounts of fuel.

The present invention brings about new improvements to such kinds of arrangements by enabling in a particularly convenient, effective, economical and profitable manner the seasonal storage of the excess heat power generated by in particular thermal and nuclear plants during the warm season (extending in particular from the beginning of April to the end of August) and the use of these heat excesses more particularly during the cold season (in particular between October and the end of January).

SUMMARY OF THE INVENTION

An arrangement according to the invention enabling such a seasonal storage comprises in particular a large capacity tank which is characterized in that it comprises a basin having a large area, provided substantially on ground level and comprising partition walls dividing the basin into several portions which communicate with one another in parallel and/or in series connected relationship, at least one hot water supply input from said power stations leading to the utilization or distributing systems opening into one portion of the basin and at least one cold make-up and/or return supply input from the utilization or distributing systems opening into another portion of said basin. The separating portions advantageously exhibit very great lengths with respect to their widths and to their depths and communicate with each other in parallel and/or in series connected relationship with their adjacent longitudinal ends. It is thus possible, provided that there are a minimum number of systems or pipe-lines and a minimum number of pumps, to provide in an effective and economical manner on surfaces of relatively reduced areas seasonal storages of huge amounts of heat which may afterwards be recovered during the desired time periods in particular for purposes of heating buildings as well as for meeting other industrial needs.

According to another novel characterizing feature of the present invention said basins for the storage of hot water are filled with a mechanically strong porous structure such as gravel and pebbles or the like. When covering the top surface of said porous structure of said basins with an impervious, that is leakage-proof or fluid-tight layer made for instance from concrete or asphalt, it is possible to subsequently cover said surface with tillable soil or tilth which will enable to grow or farm various plants under glass or in greenhouses in any season the glasshouses or greenhouses being heated by the losses or wastes, adjusted to a desirable extent, of a part of the heat stored within the basins. Such an approach seems to be very advantageous in the case where the porous structure of pebbles or gravel is already available on the spot, in particular along some river valleys.

When such a porous structure is not available beforehand, other approaches may be contemplated advantageously.

Thus for instance the tank may be designed so that the storage areas or portions to which are leading the hot water supply systems of the power stations and those to which are leading the cold make-up and/or return water supply inputs from the utilization systems are in contact with one another while being separated by at least one movable, yielding or deformable membrane or like diaphragm which separates said storage areas into at least one hot water storage body or space and at least one cold water storage body or space which added together form a substantially constant volume of storage water. When proceeding that way it is possible to provide within a basin economical structures enabling the storage of hot water and cold water the substantially invariable volumes of which will avoid any problems which could be raised or encountered with large capacity seasonal storages of water and variations in the filling levels of the basins.

In such a case and according to a preferred form of the invention, the upper storage portions have an insulating roof above which is provided a water surface or lake or pool the bottom of which is said roof. Thus is economically provided an artificial lake the water surface of which may be tempered at will and used for instance for fish-farming or fish-breeding purposes, for aquatic sports purposes and so on.

According to the invention, there is moreover provided a method of using or working and operating a tank of the aforesaid kind wherein water with a specific gravity or density and/or saltness lower than those of said storage hot and cold water is used for filling up the holding space of said lake or water surface. Thereby is automatically achieved the building up of overlying strata or layers in the upward direction which is normally the following from bottom to top: cold water storage of higher density or specific gravity, hot water storage of intermediate density or specific gravity, cold lake water of lower density or specific gravity. The hot storage water is thus entrapped between two relatively cold or warm water layers which will prevent heat losses to the atmosphere and to the ground owing to the low conductivity from one water layer to another one when such layers may not become mixed together due to the provision of a separating membrane or diaphragm. Said membrane may advantageously comprise a yielding, deformable, perfectly imputrescible film or layer of plastic material such for instance as polyethylene or others of low cost.

Above the storage body of hot water, whether salt or not, there is always arranged a "roof" which provides for some heat insulation of the stored hot water with respect to the upper outside environment. Various forms of such roofs will be described. With the word "roof" is meant any covering or disposed above the hot water storage body, it being understood that other elements according to the embodiments used may be provided above this covering.

According to an embodiment of the invention the structure of the insulating "roof" is designed so as to enable not only to compensate for the heat losses of the tank towards the outside environment but also in addition to supply the hot water storage with additional thermal energy which is taken from the outer light radiation—that is, from solar energy locally available.

Thus, according to an embodiment the upper part of the tank comprises a roof underneath which is stored the hot water, which roof will promote the inward flow of outside heat due to solar radiation towards the hot water storage and reduce the outward directed flow of heat from the storage towards the outside.

The roof advantageously comprises for this purpose at least one light radiation absorbing layer contacting the hot water storage and at least one top layer allowing the major part of the light flux to travel therethrough and reflecting the major part of the infra-red radiation re-emitted by said absorbing layer. Thus is achieved a hay box-type absorption and confinement effect which generally enables to compensate for the heat losses from the storage towards the outer environmental medium and even usually to supply additional heat energy, thereby adding to the seasonal storage of heat from the hot waters produced by the power stations a seasonal storage of heat generated by the radiation from the sun.

BRIEF DESCRIPTION OF THE DRAWINGS

Other characterizing features, objects and advantages of the invention will appear more clearly as the following detailed explanatory description proceeds with reference to the accompanying diagrammatic drawings given by way of examples only and wherein.

DETAILED DESCRIPTION

Figure 1:
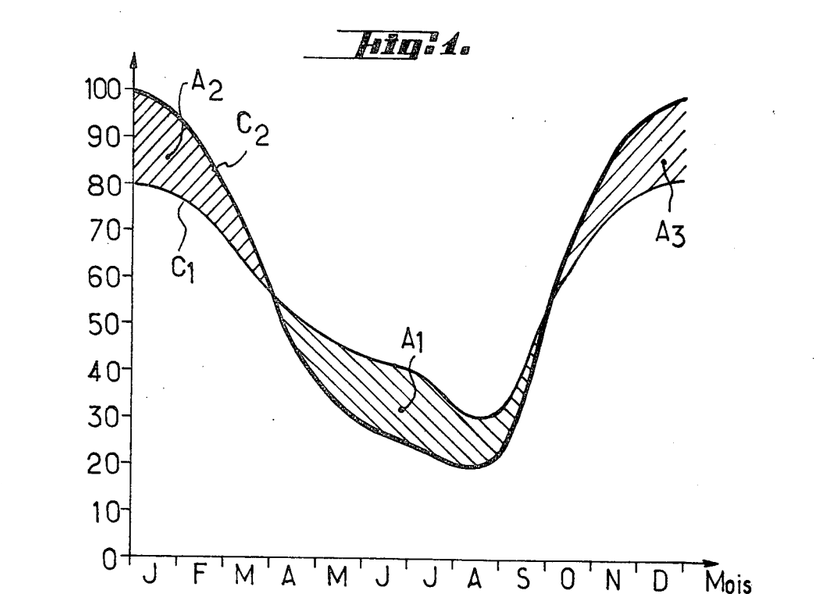
FIG. 1 is a graphical chart showing the seasonal correlation between the production of heat rejected by the thermal and nuclear power stations in France and the seasonal needs in heat in particular for district heating purposes.

FIG. 1 which illustrates the economically interesting character of the invention will be referred to first. In this Figure the curve $C_1$ gives the amount of heat weighted over several years, discharged as waste in France by the thermal and nuclear power stations into the rivers or into the atmosphere (while taking into account the overall efficiency of electricity production which is of about 30% to 35%), this amount of heat being plotted as the ordinate as a function of the time period of the year plotted as the months in abscissa.

Likewise in this Figure the curve $C_2$ gives the seasonal needs in heat more particularly for district heating purposes.

From a comparison of both curves it appears that the production of waste heat by the power stations is higher than the heat required for the warm season (in particular from April to August) and that it is lower than the heat required for the cold season (in particular from November to February).

Therefore when using the "total energy" process advocated in the aforesaid U.S. patent application according to which the heat generated by the power stations and not converted into electrical power is used for heating dwelling premises and for various other industrial applications (chemical industry, soap works or like factories, wash-houses, laundry-rooms and so on) it has been found that during warm time periods the power stations supply an excess of energy which may not be used at that time whereas during the cold season they do not generate enough power.

When comparing both curves $C_1$, $C_2$ it appears that the hatched or shadowed area A1 between the curves $C_1$ and $C_2$ which corressonds to the amount of excess energy supplied by the power stations during the warm seasons has a surface area substantially equivalent to the added hatched or shadowed surface areas designated at A2, A3 which show the additional energy requirements in the form of heat during the cold seasons which may not be met by the power stations. It is moreover seen that the surface area $A1=A2+A3$ is about 10% of the surface area defined between the curve $C_1$ and the axis of abscissa, i.e. corresponds to 10% of the total energy released as heat by the power stations.

Thus by storing a part of the excess power released by the power stations during the warm seasons it is possible to decrease by more than 20% the maximum power output of said power stations which would otherwise have been required to meet the demand (by absorbing the power requirements corresponding to the areas A2, A3 and by decreasing the requirements from 100 points to less than 80 points).

The invention advocates a specific tank and plant construction which enables such seasonal storage of large amounts of heat and a practical later re-use or recovery thereof while providing for a valorization of the sites.

Figures 2, 3:
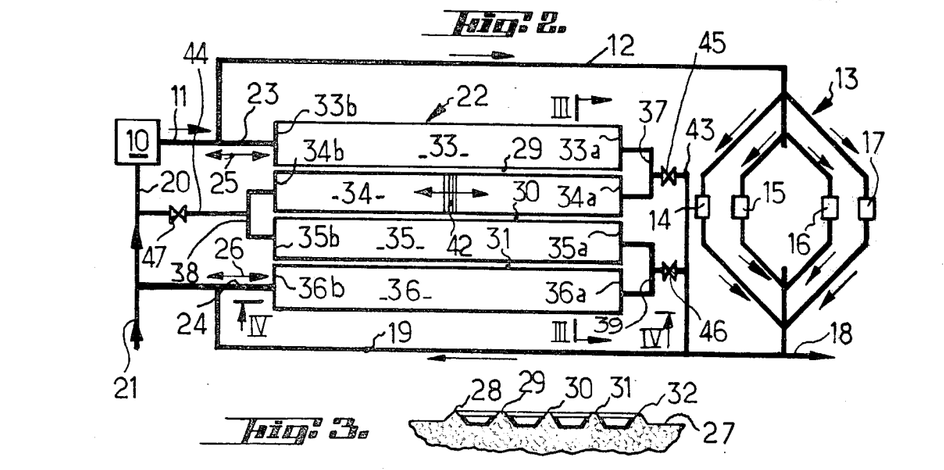
FIG. 2 is a diagrammatic view of the layout of a plant designed according to the invention and enabling the seasonal storage and use of the excess heat produced by a power-generating station.
FIG. 3 is a view in cross-section taken substantially upon the plane III—III in FIG. 2 through the tank structure shown in FIG. 2 and designed according to the invention.
Figure 4:
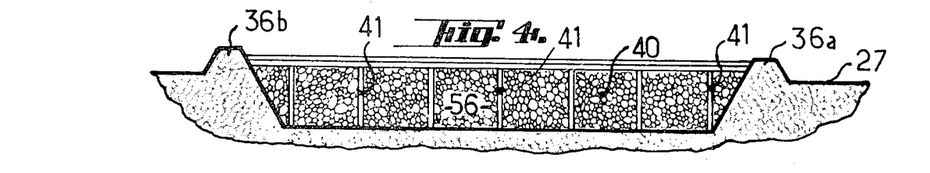
FIG. 4 is a longitudinal sectional view drawn on a larger scale through a tank structure of the kind illustrated in FIGS. 2 and 3.

The form of embodiment shown in FIGS. 2 to 4 will now be referred to.

Referring at first to FIG. 2 the reference numeral 10 designates a for instance thermal power station which serves the purpose of generating electricity and which rejects hot water at a temperature of for instance 70° C. to 90° C. as a waste by-product. The hot water rejected by the power station is discharged by a pipe-line 11. The pipe-line 11 is feeding a pipe-line 12 leading to a utilization system 13 diagrammatically shown at 14, 15, 16 and 17. At the outlets of the utilization appliances 14-17 the cooled water may be drained off in part at 18 for instance towards rivers and recycled at 19 towards the pipe-line 20 feeding cold water into the power station 10. At 21 is shown a source of cold make-up water required to compensate for the losses and wastes.

In order to enable a feedback control of the circuit there is provided at 22 a large-capacity tank for the seasonal storage of hot water in particular during summer time and from which water may be drawn to meet the peak requirements in particular during winter time. At 23 is shown the connection between the pipe-line 11 for the hot water issuing from the power station and the tank 22 and at 24 is shown the junction of the tank 22 with the cold water circuit 19, 21. The double arrows 25, 26 show that there may be an addition or input of hot water into the tank 22 and a correlative drawing-off or output of cold water or reversely a drawing-off or output of hot water and a correlative addition or input of cold water.

As clearly apparent from FIGS. 2, 3 and 4, the tank 22 is a tank with a large surface area provided substantially on ground level 27 and comprising partition walls 28, 29, 30, 31, 32 which divide the basin into several water retaining portions 33, 34, 35, 36 which communicate with one another. In the example shown, the portions 33–36 communicate with each other in series relationship through connections diagrammatically shown at 37, 38, 39 at their adjacent ends 33a, 34a; 34b, 35b; 35a, 36a, respectively.

According to a preferred embodiment of the invention the hollow space of the basin is essentially filled as shown in FIG. 4 with a porous structure consisting of gravel or pebbles 40. Moreover, porous or perforated partitions 41 are advantageously provided within each channel such as 33, 34, 35, 36 at intervals along the separating portions of the basin (FIG. 4).

The basin may be made according to any known suitable process and for instance according to a process similar to the one which is used for providing hydraulic dams or weirs for the so-called "earth" dam type such as in Serre-Poncon.

In this instance it is only necessary to dig trenches into the ground which will form the portions 33, 34, 35, 36 the waste or excavated material forming the raised or elevated walls of the channels 28, 29, etc.. The walls will be compacted, covered with fine inert material such as sand and sealed or made impervious in fluid-tight or leak-proof relationship with sheets or foils of plastic material welded or bonded to one another. The channels may be several hundreds of meters long and a few tens of meters wide and deep.

Upon performing the computations it appears that a few hundreds of hectares of tank surface area thus formed will be enough to allow the seasonal storage in France of any amounts of hot water released in excess by the thermal and nuclear power stations during the warm seasons and the re-use of such a stored heat during the cold seasons.

The working of the plant shown in FIG. 2 is carried out as follows.

The thermal power station 10 discharges its excess hot water through the pipe-line 11 towards the pipe-line 12 and the utilization system 13. When the amounts of hot water supplied by the power station are higher than the requirement of the users or consumers, the excess hot water is fed by the pipe-line 23 into the tank 22 at the inlet 33b of the channel 33. The hot water is flowing slowly and regularly forward within the channel 33 while driving back gradually ahead of it the interface or separation front with the cold water which has been assumed to be located at 42. The hot water taken into the tank will heat up the pebbles and accordingly cool down while flowing forward, thereby considerably decreasing the actual speed of travel of the interface or separation front 42 between the cold water and the hot water with respect to the speed of flow of the water within the tank. At the same time the hot water is fed into the tank through the pipe-line 23, the cold water is drawn from the tank through the pipe-line 24.

With a view to restrict the head or pressure losses there may possibly be provided shorter return circuits or paths for the cold water such as diagrammatically shown at 43, 44 provided with valves 45, 46, 47. Thus in the embodiment shown in FIG. 2 when the interface or separation front between the hot water and the cold water is located at 42, the valves 45, 46 may be closed and the valve 47 may be opened for allowing the return of cold water to take place directly between the end 34b of the channel 34 and the return pipe-line 20 by-passing the channels 35, 36.

When the requirements of the demand are higher than the flow rate supplied by the power station 10, hot water will be taken from or drawn off the tank 22 through the pipe-line 23, a corresponding cold water flow rate being injected at the other end of the tank or also for instance through the pipe-line 44 in the example shown. In a manner reverse to the heating up process of the tank described hereinabove the cold water front 42 will advance much more slowly than the cold water flow rate injected into the tank while taking into account the gradual cooling down of the pebbles.

Thus with a relatively small bulk of stored water which may be or not recycled wholly or in part, there is provided a seasonal storage of huge amounts of energy within the bodies or masses of the pebbles of the basin.

According to another advantageous characterizing feature of the invention and as will become apparent more clearly in the following description of another embodiment shown in FIGS. 5 to 9, the porous structure is covered or lined over the surface thereof with an impervious or sealing layer such as a concrete or asphalt layer possibly covered with a heat-insulating material. This surface which remains tempered in any season is suitable to receive playgrounds or like playing areas, concert halls, glasshouse cultivations, etc.

Although in FIGS. 2 to 4 there has been depicted a rectangular basin structure divided into several longitudinal juxtaposed channels it is obvious that other shapes of basins in particular adapted to local conditions may be selected such as for instance circular, elliptic, spiral and other shapes. In any case one should advantageously contrive to divide the basin into several elongated separation zones which may communicate with each other in parallel and/or in series connected relationship to enable a good programmed working of the whole surface of the basin.

Reference is now made FIGS. 5 to 9 wherein a particularly advantageous process of the making a tank according to the invention has been illustrated.

Figure 5:
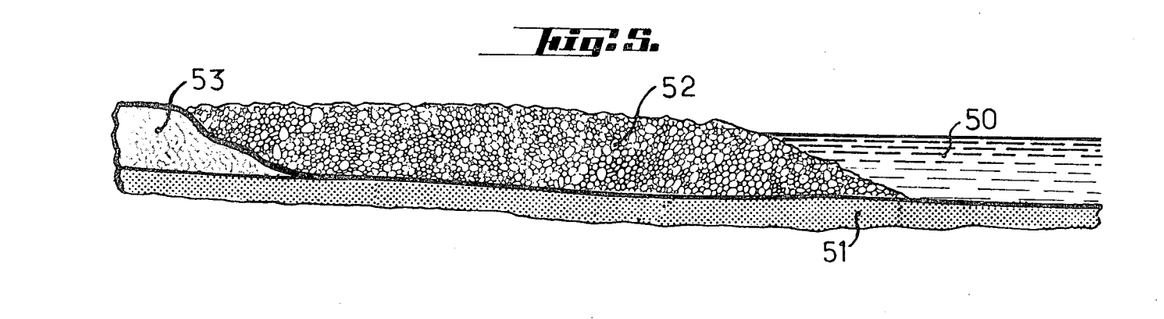
FIG. 5 is a cross-sectional view diagrammatically showing a structure of grounds commonly encountered along a river.

In FIG. 5 is diagrammatically shown a sectional view of a rather conventional formation which may be encountered at different geographical places and in which there may be found along a river 50 a bed of gravel 52 resting on an impervious layer of marl or clay 51 and which often is several meters thick, a few hundreds of meters wide and several kilometers long. At 53 may be seen one edge, brink or verge of the valley consisting of any kinds of grounds.

Figure 6:
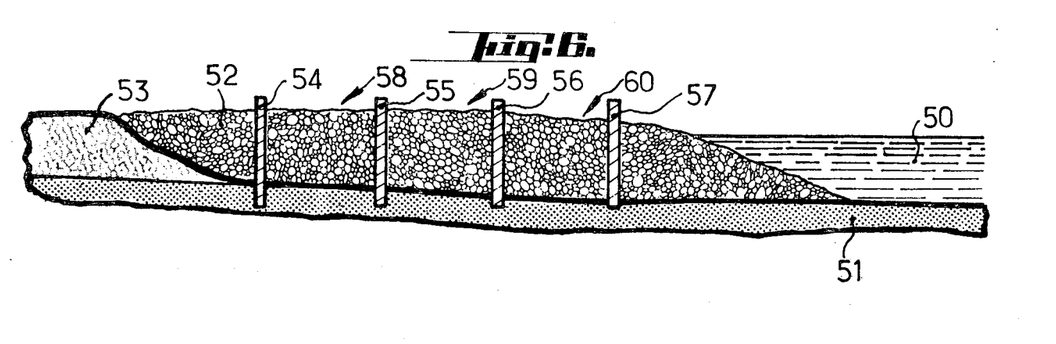
FIG. 6 shows the structure of grounds as illustrated in FIG. 5 which has been used to provide a storage tank according to the invention.

In such a formation there are provided according to the invention as seen in FIG. 6 fluid-tight walls 54, 55, 56, 57 made for instance from concrete and which extend through the thickness of the porous structures of the pebbles 52, said walls defining between one another channels or separation zones 58, 59, 60. The concrete partition walls 54, 55, 56, 57 may be built according to any suitable process for instance through continuous casting with a travelling shuttering or formwork moving behind a ripper blade or the like which opens the bed of pebbles down to the marl layer 51. In such a manner as diagrammatically shown in top view in FIG. 7, there is provided a tank of a general type similar to that illustrated in FIGS. 2 to 4, comprising channels 58, 59, 60 limited by channels 54 to 57 and closed at their ends by walls 61, 62.

Figure 7:
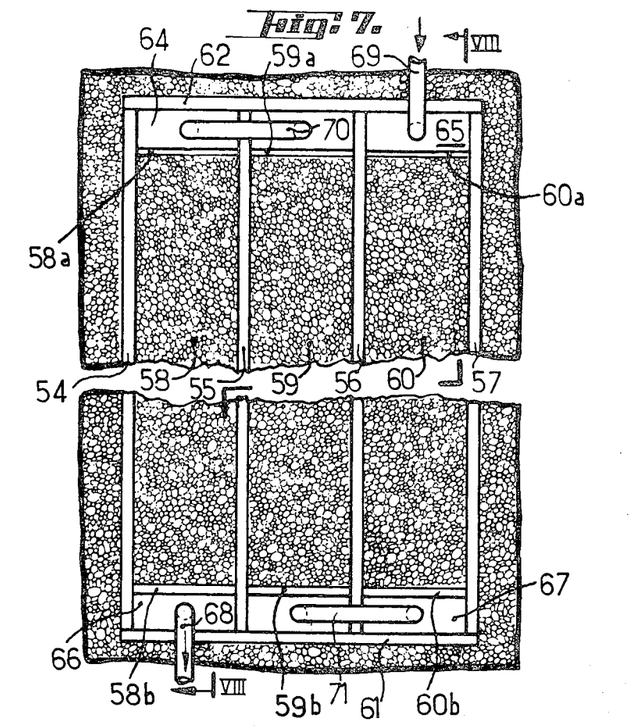
FIG. 7 diagrammatically shows a top view of the tank made as shown in FIG. 6.

Towards each end of the channels there are advantageously provided porous partitions 58a, 59a, 60a; 58b, 59b, 60b which will retain the pebbles and leave at each end of the channels spaces 64, 65, 66, 67 in which are arranged ducts for interconnecting the channels and/or drawing off and adding hot water and cold water.

In the tank shown in FIG. 7 the pipe-lines 68, 69 respectively perform the function for instance of the pipe-lines 23, 26, the inputs and outputs of hot water taking place at 68 and the inputs and outputs of cold water taking place at 69.

The junctions 70, 71 correspond to the junctions 37, 38, 39 in FIG. 2.

It is obvious that more than three channels may and will usually been used and various junctions (not shown) will enable the working or operation in parallel and/or in series connected relationship according to the requirements and to the local layouts of the various separation zones of the tank.

Figures 8, 9:
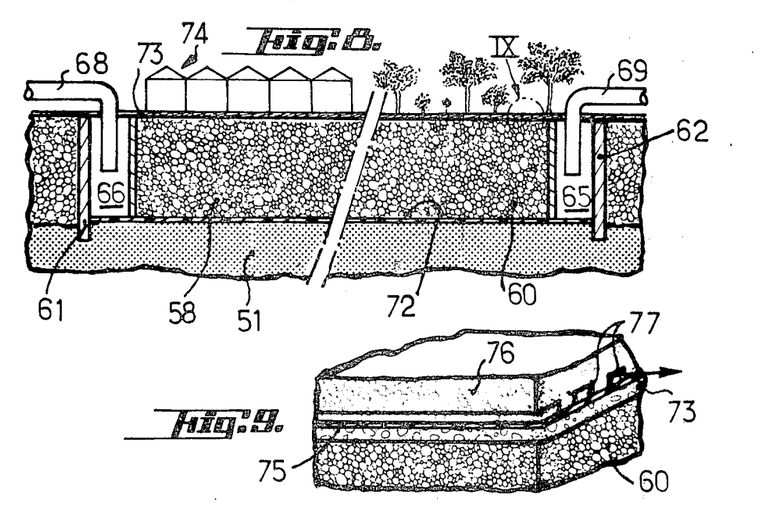
FIG. 8 is a view in longitudinal section taken substantially upon the plane VIII—VIII of FIG. 7.
FIG. 9 is a view drawn on a larger scale of the encircled detail IX of FIG. 8, showing the composition of the ground above the tank.

If desired and as illustrated in FIG. 8 the bottom of the tank may be provided with an insulating layer 72 consisting for instance of injected plastic foam which will limit the heat losses towards the adjacent grounds.

The surface of the basin should advantageously be covered with a fluid-tight layer for instance of concrete or asphalt 73 which will limit the evaporation and heat losses and onto which may be arranged glasshouses 74 for the forcing of plants such as fresh or early vegetables, exotic trees (oranges, etc.). Cultivation in the open air or out of doors may also be contemplated.

On ground level there should advantageously be arranged as shown on a larger scale in FIG. 9 over the pebbles 60 a concrete or asphalt layer 73 and then a layer of a suitable heat-insulating material 75 (glasswool, plastic foam, etc.). If cultivations are contemplated, a layer of tillable soil or tilth 76 should be arranged above the layers 73, 75 and should advantageously be formed with ventilation ducts 77 in particular for the hot summer-time periods.

Many modifications may of course be brought about to the forms of embodiment and working examples described which have been given by way of illustration only.

Thus in particular in the case where the surfaces of the grounds occupied by the hot water storage is covered with cultivations, in particular in glasshouses, the basin will advantageously be divided into several zones in which the hot water and cold water will be cyclicly drawn therefrom and fed thereto according to the requirements or needs of the demand while however taking into account the cyclic cultivations carried out at the surface within said zones.

Moreover in a manner reverse to what has been described it is possible to store in the tank during winter time cold water, i.e. that which is injected at the same time the hot water is drawn off and to use the cold water during summer time as a coolant for condensers, refrigerating machinery, heat engines, air-conditioning of rooms and premises, etc. Storages at temperatures lower than 0° C. may possibly be carried out by using instead of water other suitable solutions such as brines, etc.

Figure 10:
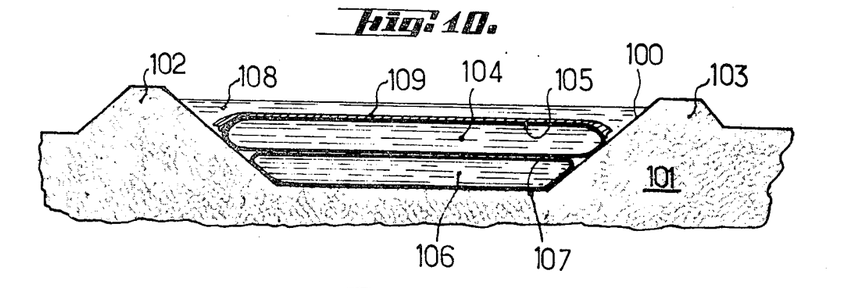
FIG. 10 is a diagrammatic view in cross-section through a tank according to an alternative embodiment.

According to the embodiment diagrammatically shown in FIG. 10 there is seen a cross-sectional view of a basin 100 which is dug out or excavated like a trench within grounds 101, the waste or excavated materials serving the purpose of forming retaining side dikes or embankments 102, 103. Such a basin may of course be given any desired length so as to match the amounts of water which are desired to be stored and several basins of this kind may be connected in parallel and/or in series relationship while being laid out according to favorable local conditions.

In this basin has been enclosed the bulk of hot water storage 104 inside of a pocket the membrane 105 of which is displaceable and deformable and for instance made from a sheet of plastic material such as polyvinyl, polyethylene, etc.

Likewise the bulk of cold water storage 106 has been enclosed within a pocket the membrane 107 of which may be made in a way similar to that of membrane 105. It is advantageous as shown that the bulk of hot water storage 104 be positioned above the bulk of cold water storage 106 so that the lighter hot water will naturally top or overlie the heavier cold water.

According to a particularly advantageous characterizing feature of the invention both bulks or bodies of storage water 104, 106 are topped by a body of water 108 which will usually be open to the atmosphere and which thus forms a water surface or artificial lake. In order to limit the heat exchanges between the hot pocket 104 and the body of water 108 there should advantageously be provided above the bodies of storage water an insulating roof 109 made for instance of a plastic foam.

According to an original and interesting characterizing feature of the invention, in order to provide for a normal stratification or arrangement into overlying layers of the stored waters, waters with specific gravities or densities and/or saltnesses higher than those of the water 108 should be used as storage waters 104, 106. For instance soft water may be used to provide the water surface 108 and salt water for instance sea water or a water loaded with potassium salts, baryum oxide, etc. may be used as the storage water 104, 106. For instance it will thus be found above at 108 soft water at about 10° C. to 30° C. with a specific gravity of from 1 to 0.996 and for the body 104 hot salt water for instance sea water having at 90° C. a specific gravity of about 1.010 and underneath the same salt water having at about 30° C. to 50° C. a specific gravity of 1.013.

Figure 11:
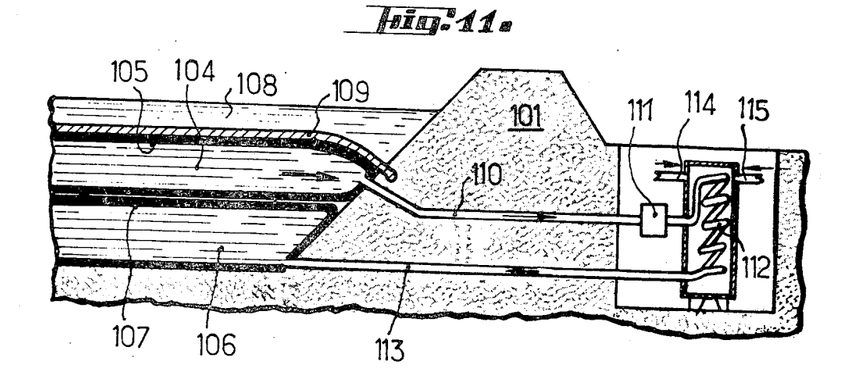
FIG. 11 shows on a larger scale a detail construction of the connections at one for instance longitudinal end of the tank basin and of the heat distributing system leading from the tank.

As shown in FIG. 11 such a basin is operated as follows.

When an outside heat requirement occurs, for instance to heat buildings, hot water from the storage body 104 is pumped through a pipe-line 110 and a pump 111 through a heat exchanger 112, the back flow or return of cold storage water being effected through the return duct 113 into the body of cold storage water 106. At 114, 115 has been diagrammatically shown the input or return 114 of the cold water of the system and at 115 is shown the output of the hot water towards the distribution and utilization system (central heating of buildings in particular).

It is thus found that as the bulk of the body of stored hot water 104 decreases, the bulk of the body of stored cold water 106 will increase accordingly, the storage tank operating at a substantially constant capacity or volume except for losses and variations in expansion.

An exchanger of the same kind as the exchanger 112 may of course be used by reversing the direction of flow through the pump 111 so that when the heat production of the power stations is higher than the requirements or needs the heat of the waste hot waters discharged by the power stations may be used for heating the cold storage waters 106 and convey or feed them in the re-heated condition into the storage body 104.

Figure 12:
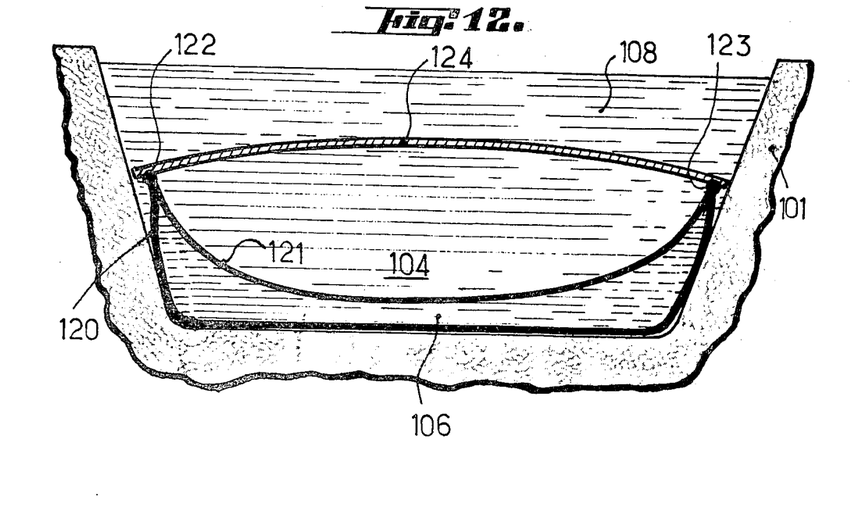
FIGS. 12 and 13 are diagrammatic cross-sectional views showing tanks designed according to two other alternative embodiments, respectively.

According to the alternative embodiment shown in FIG. 12 the body of cold storage water 106 is enclosed between two yielding or flexible, deformable and movable membranes or diaphragms 120, 121 which are connected as by bonding or welding and anchored with their edges 122, 123 to a flexible insulating roof 124. The body of hot storage water 104 is enclosed between the membrane 121 and the roof 124. Above the roof 124 there is again the body of water 108 forming the water surface. Except for a difference in construction, the arrangement shown in FIG. 12 may operate like that shown in FIGS. 10 and 11.

Figure 13:
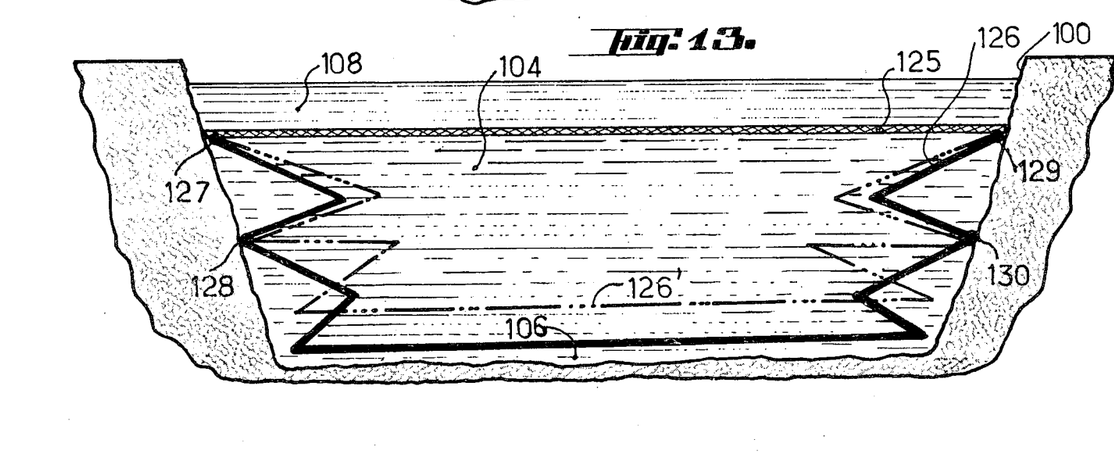

According to the alternative embodiment shown in FIG. 13, the body 104 of hot water storage is this time enclosed between an insulating roof 125 comprising for instance an impervious layer of plastic foam and a flexible deformable membrane 126 forming bellows on the sides and properly anchored as shown at 127, 128, 129, 130 to the brinks or edges of the basin 100. The anchoring may be made at discrete spots or along edge lines.

The cold storage water 106 is stored below the roof 125 and outside of the body 104. Thereabove is provided the water surface 108. According to the operating requirements the pocket 104 will become deformed. There has thus been shown at 126' another position of the membrane 126 in which the tank contains less hot storage water and more cold storage water.

Figure 14:
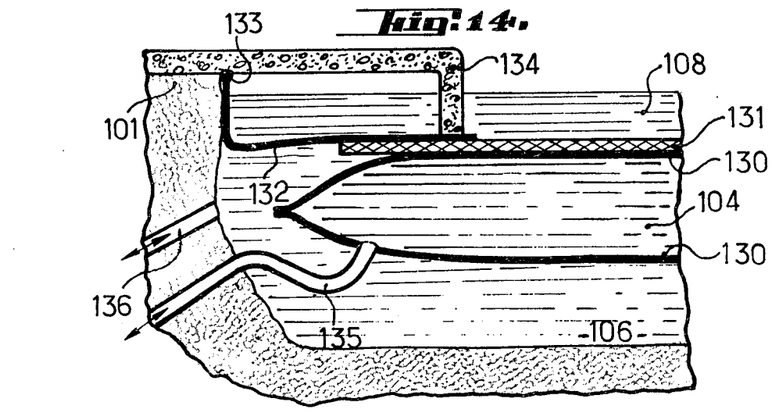
FIG. 14 illustrates on a larger scale a detail of the connection of the hot water and cold water storage tanks with the outside as well as a detail of the fastening means for the insulating roof of the storage means.

In FIG. 14 there has been shown another alternative embodiment wherein the body of hot storage water 104 is enclosed within a pocket defined by a membrane 130 which is protected at the upper part by an insulating roof 131 which is resting thereon. The body 106 of cold storage water surrounds the pocket 104 which will automatically float at the top portion owing to the specific gravity of the hot storage water which is lighter than the cold storage water. Above the roof 131 is provided again the water surface 108. In order to provide for a good separation between the bodies 106, 108 and allow the motions of expansion of the roof 131 the fluid-tightness of the roof 131 and of its connection with the edges or brinks of the basin is achieved by means of a flexible membrane or diaphragm 132 properly anchored at 133 above the level of the water surface 108, which membrane-like sheet 132 is connected to the roof 131. A springing or overhanging portion 134 made for instance from concrete protects the relatively fragile flexible sheet 132 against external actions which are likely to tear or rip it open.

At 135, 136 are seen the storage working ducts which perform functions similar to those of the ducts 110, 113 in FIG. 11.

Figures 15, 16:
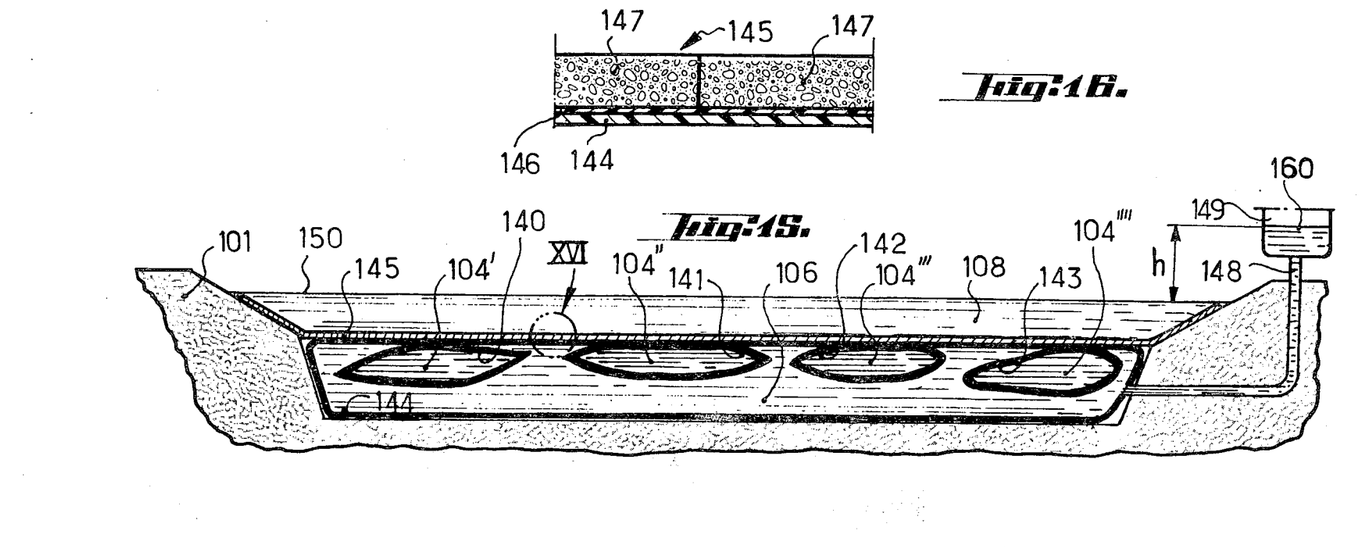
FIG. 15 is a cross-sectional view of a storage tank designed according to another embodiment of the invention.
FIG. 16 shows on a larger scale the encircled detail part XVI in FIG. 15.

According to th alternative embodiment shown in FIG. 15 the body of hot storage water 104 is divided into several adjacent bodies 104', 104", 104''', 104'''' which are each one enclosed within a hose-like membrane 140, 141, 142, 143 which may extend the whole length of the basin. The pockets 104', 104", etc. are surrounded by the lower body portion 106 of the basin reserved for cold water storage purposes and are floating at the surface of said body. In the example shown the space 106 is made fluid-tight by means of a flexible membrane 144. Above the storage waters is advantageously provided a protecting insulating roof 145 which forms the bottom of the artificial lake filled with the upper body of water 108.

In the case where the lake is adapted to serve for instance for aquatic sports it will be advantageous to provide a protecting roof 145 strong enough to remove any danger of damaging the lower portion of the basin holding the storage waters. For this purpose and as shown in FIG. 16 the roof 145 may be made from a sealing sheet 146 which may be fitted to cover the sheet 144 of the body 106 and on which sheet 146 will be arranged blocks of protecting material for instance cellular concrete blocks 147. In order to bear the weight of the roof the lower storage space of the basin may be subjected as shown in FIG. 15 to a slight water overpressure by connecting for instance the space 106 through a duct 148 to a small supply container 149 in which will be kept a given water level 160 located at the desired height h above the water surface 150 of the lake. This slight overpressure will enable to very readily sustain the weight of the roof whatever its nature might be.

According to the alternative embodiment shown in FIG. 17 there are again three overlying bodies of water namely of cold storage water 106, of hot storage water 104 and of the water of the lake 108 together with a protecting roof 151 which may for instance be of a construction similar to that of the roof 145. In this instance as in FIG. 15 a slight overpressure h should be provided in order to bear the weight of the protecting roof 151.

Figure 17:
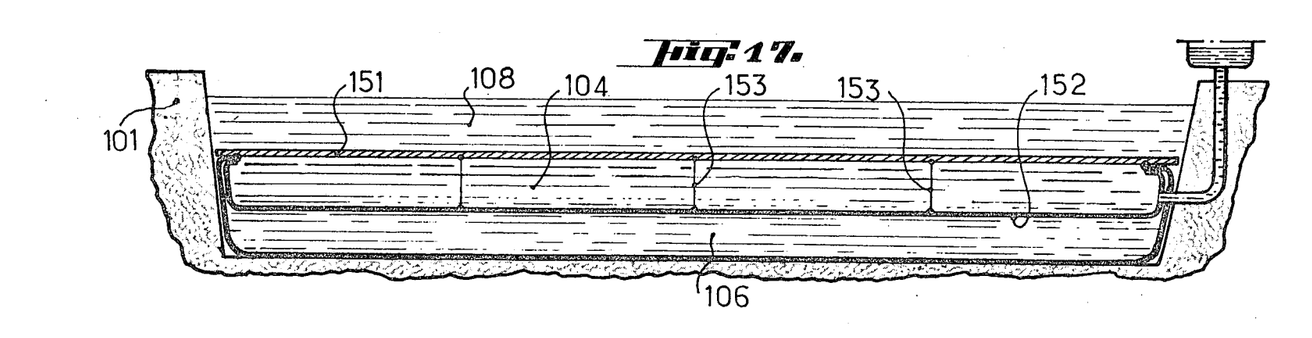
FIG. 17 is a cross-sectional view illustrating another modification.

The body 104 of hot water and the body 106 of cold water may be separated from each other by a flexible deformable and/or movable membrane 152 which may be connected from place to place by means of rigging lines or ropes 153 to the roof 151. The operation of the tanks may of course be performed in the same manner in the forms of embodiment which have just been described and in the one which has been discussed when depicting FIGS. 10 and 11 for instance.

Figure 18:
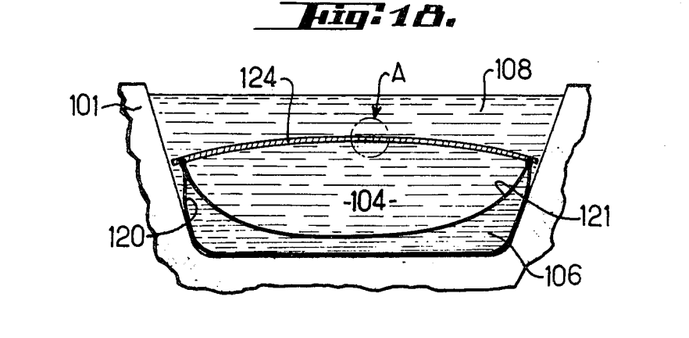
FIG. 18 is a diagrammatic cross-sectional view showing a tank of the kind described in said U.S. Pat. No. 3,996,749.

According to the embodiment shown in FIG. 18 there is shown again a structure which has already been described with reference to FIG. 12. There is thus seen a membrane 124 which forms the roof covering the body 104 of hot storage water enclosed between the membrane 121 and the roof 124. Underneath the body of hot storage water 104 there is provided the cold storage water 106 enclosed between the membrane 121 and a membrane 120, the storage comprising more or less bulky relative bodies of hot water 104 and of cold water 106 according to the season. Above the roof 124 is formed a water surface 108 enclosed in a sink or trough of ground 101.

The improvements relating to the construction of the "roof" which will now be described are very well applicable to this kind of tank but also to other embodiments of the tank described with reference to the other Figures.

Figure 19:
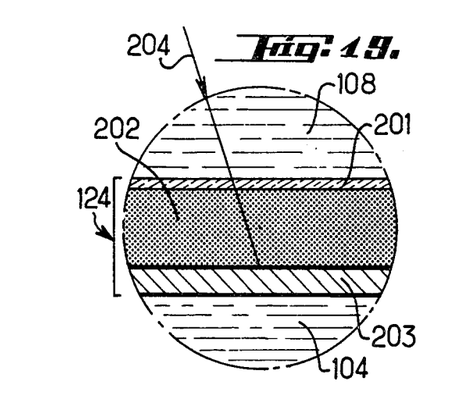
FIGS. 19 to 22 are sectional views of the encircled part A in FIG. 18, drawn on a larger scale and diagrammatically showing various tank roof constructions for practicing the improvements forming the subject matter of the invention.

Reference will now be had to FIG. 19 illustrating the manner of making the roof in accordance with these improvements.

According to the embodiment shown herein the membrane of the roof 124 is of a sandwich construction of three layers, namely a top layer 201 which lets the major part of the light flux pass therethrough, a transparent layer 202 with a low coefficient of heat conductivity and a layer 203 which absorbs the major part of the light radiation received.

For instance the layer 201 may consist of a transparent sheet of plastic material such as transparent butyl rubber or any suitable synthetic material such as for instance a polyester film, a polyethylene terephthalate resin such as known under the registered trademark "MYLAR R" or the like. The layer 202 may consist of a transparent synthetic foam having a low thermal conductivity. The layer 203 may consist for instance of a butyl rubber with a carbon black filler.

The light flux, such as for instance solar radiation diagrammatically designated by the arrow 204, after having passed through the top water layer 108 travels through the transparent film 201 and then through the transparent layer 202 and is eventually absorbed by the absorbing layer 203. The infra-red radiation re-emitted by the layer 203 is reflected by the layers 202 and 201 back towards the hot storage water 104 so that the heat supply from solar radiation generally enables to compensate to a large extent for the heat losses of the hot storage water towards the outside. The efficiency is of course not perfect since some part of the sun radiation 204 is reflected back by the water layer 108 and also by the layers 201 and 202. Moreover all the heat absorbed at the layer 203 is not used for heating the hot storage water 104. However with such a construction of the tank roof and without any additional expense the overall efficiency of the plant is improved. By way of example the sheet 201 may have a thickness of about one millimeter whereas the layer 202 may have a thickness of about 25 mm and the sheet 203 may have a thickness of about 2 mm.

Figure 20:
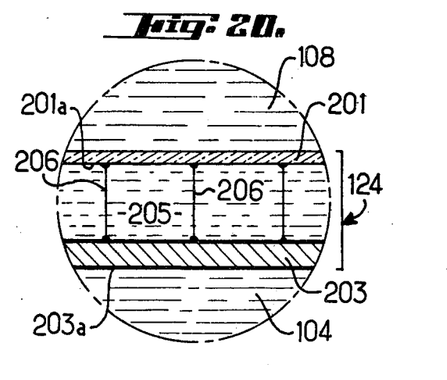

According to the alternative embodiment shown in FIG. 20 for constituting the roof 124 use is made of a composite membrane comprised of a sandwich construction composed of the films 201 and 203 for example identical with those shown in FIG. 19 which enclose therebetween a gas or fluid 205 which plays the part of the layer 202. Spacers or like bracing members such as rods or threads 206 properly secured to the sheets 201, 203 provide for the proper spacing left between these two sheets.

The nature of the gas or fluid 205 used is selected so as to be consistent with a good preservation of the sheets 201 and 203 and also so as to promote the transmission of heat power in the form of light from the outside towards the tank and to reduce the flow in the reverse direction or outwards from the tank towards the outside of the heat through radiation and conduction.

Alternatively there may be used as a fluid 205 for instance water which may form a buffer layer at an intermediate temperature between that of the hot water layer 104 and that of the upper cold water layer 108 reducing the outward directed heat emissions from the tank towards the outside. This hot water layer 205 may possibly be introduced into the storage space or mixed with the storage water while adjusting the supply and mixing flow rates according to the temperature reached by the layer 205 in accordance with the actual outside conditions prevailing at that time. The pressure of the fluid or gas 205 will of course be kept at the desired value to provide the proper spacing between the sheets 201 and 203. The gas may for instance be air or nitrogen introduced under a suitable pressure for instance lower than atmospheric pressure so as to improve the insulation of the composite membrane. In such a case in particular the lower layer 203 and/or the upper layer 201 may be made so as to be formed with a bright bottom surface 203a, 201a in order to take advantage of the DEWAR effect.

Figure 21:
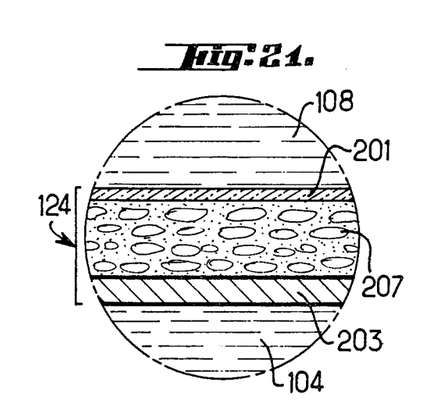

According to the alternative embodiment shown in FIG. 21 the sheets 201 and 203 enclose therebetween a layer 207 comprised of a cellular plastic foam with oriented cells having their major size surfaces extending substantially horizontally. This foam should be selected so as preferably to be transparent or in particular translucent so that the outer light radiation may travel easily therethrough whereas the orientation of the cells will reduce the outward directed heat emission through radiation and conduction from the storage space towards the outside.

Figure 22:
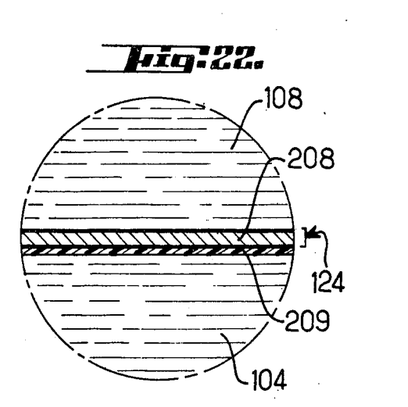

According to the embodiment shown in FIG. 22 the roof 124 separating the cold water 108 from the hot water 104 essentially comprises a layer 208 absorbing the outer light radiation, made of for instance a layer of heavy hydrocarbon. This hydrocarbon layer may be arranged upon a fluid-tight film 209 for instance in a manner similar to that which has been described previously in particular with reference to the description of FIGS. 15 and 16.

By selecting the layer 208 to be thick enough it will both perform a function of mechanical protection of the tank roof and a function of storing solar heat capable of compensating for at least a major part the outward directed heat losses from the storage space towards the outside. Moreover the layer 208 will promote a certain temperature increase of the cold water 108 which may be favorable for fish-breeding or for building swimming pools.

The application procedures which have been described of the improvements to the construction of the roof may of course be applied to most of the described embodiments of the invention. The essential idea resides in providing the roof of the storage space so as to promote the conveyance of outer heat due to solar radiation towards the hot water storage and to reduce the conveyance of heat from the storage space towards the outside.

What is claimed is:

1. A large-capacity tank for seasonal storage of hot water, produced for example by electric power-generating thermal and nuclear stations, and for their seasonal use, for example for the heating of buildings, comprising:

a water containing basin of large surface area;

two superposed individual inflatable pockets contained in said basin, the bottom pocket being for storage of cold water, and the upper pocket being for storage of hot water at a temperature near 90° C., both of said pockets lying under water contained in said basin;

at least one of said pockets having an impervious plastic sheet deformable wall located between the contents of said upper and bottom storage pockets;

first means coupled to said bottom storage pocket for supplying and recovering cold water stored in said bottom storage pocket;

second means coupled to said upper storage pocket for supplying and recovering hot water stored in said upper storage pocket; and means coupled to said first and second means for controlling the flows of water such that an instantaneous supply of hot water into said upper storage pocket is balanced by a corresponding drawing off of cold water into said bottom storage pocket, and such that an instantaneous drawing off of hot water into said upper storage pocket is balanced by a corresponding supply of cold water into said bottom storage pocket, said bottom and upper storage pockets providing together a substantially constant volume body of storage water.

2. A tank according to claim 1 further comprising duct means coupled to said upper hot water storage pocket and to said bottom cold water storage pocket; and a heat exchanger coupled to said duct means for supplying heat to the water flowing in said duct means when circulation of water occurs from the bottom cold water storage pocket to the upper hot water storage pocket, and for taking off heat from the water flowing in said duct means when circulation of water occurs from the upper hot water storage pocket to the bottom cold water storage pocket.

3. A tank according to claim 1 wherein at least one of said pockets comprises a bladder anchored to the walls of said basin.

4. A tank according to claim 1 wherein each one of the pockets comprises a sealed closed volume the wall of which is made of an impervious deformable plastic sheet.

5. A tank according to claim 1, wherein the upper storage pocket is provided with an insulating roof above which is formed a water surface or lake, the bottom of which is constituted by said roof.

6. A tank according to claim 5, wherein the volume of said lake or water surface comprises a water having a specific gravity and/or saltness lower than those of said stored hot waters and cold waters.

* * * * *